3,297,794
POLYMER PRODUCT COMPRISING METHACRYLIC ESTER AND α-METHYLSTYRENE, AND PROCESSES OF PRODUCING SAME
Kiyokazu Imai, Kurashiki-shi, Japan, and Yutaka Sakurada, Menlo Park, Calif., assignors to Kurashiki Rayon Co., Ltd., Kurashiki-shi, Japan, a corporation of Japan
No Drawing. Filed Apr. 19, 1963, Ser. No. 277,663
Claims priority, application Japan, Apr. 27, 1962, 37/17,063
4 Claims. (Cl. 260—885)

This invention is concerned with a novel resin composition having improved physical properties, particularly improved heat-resistance, while at the same time exhibiting desirable transparency and impact resistance.

It is generally known that a methacrylic resin with improved heat-resistance can be produced by the copolymerization of a methacrylic ester and α-methylstyrene. However, α-methylstyrene does not readily copolymerize by a free radical mechanism. Accordingly, the copolymerization of a methacrylic ester and α-methylstyrene is difficult to effect. For example, in the case of the polymerization at 60° C. of methyl methacrylate alone, polymerization is essentially complete after 17 hours of reaction with 0.005% by weight of 2,2'-azobis-isobutyronitrile, with a polymer conversion of 98% or higher. In contrast, in the case of the copolymerization, at the same temperature, of 75% by weight of methyl methacrylate and 25% by weight of α-methylstyrene, the rate of polymerization after as many as 114 hours of reaction is only about 39%, even when using 0.079% by weight of 2,2'-azobis-isobutyronitrile, which is about 16 times the amount of catalyst used for the homopolymerization of methyl methacrylate alone. This is clear evidence that the addition of α-methylstyrene to methyl methacrylate seriously interferes with the polymerization of methyl methacrylate. For this reason, this copolymerization is, as mentioned, difficult to carry out in a practical manner.

It is accordingly an object of this invention to provide a method of producing a resin product containing a methacrylic ester and α-methylstyrene, and having improved heat resistance, which avoids the drawbacks mentioned above.

It is a further object of the invention to provide a novel resin product containing a methacrylic ester and α-methylstyrene and exhibiting high heat-resistance.

We have now discovered that a methacrylic ester of the formula $CH_2=C(CH_3)COOR$, wherein R is cyclohexyl or lower alkyl, e.g. methyl, ethyl, or propyl, readily dissolves poly-α-methylstyrene. We have further discovered that a solution of poly-α-methylstyrene in such a methacrylic ester permits the polymerization of the methacrylic ester to proceed easily and smoothly, to produce a substantially transparent or semitransparent resin which has increased heat-resistance in comparison with the conventional methacrylic ester homopolymer. This polymerization of a methacrylic ester in the presence of poly-α-methylstyrene in dissolved form is different from the copolymerization of the methacrylic ester with monomeric α-methylstyrene, in that the former polymerization involves none of the problems referred to above which have been encountered in attempting to effect the copolymerization of the two monomers. Furthermore, in the case of the methacrylic ester-poly-α-methylstyrene system, it is possible to effect concurrent molding and polymerization, which is not possible in the case of copolymerization of a methacrylic ester with monomeric α-methylstyrene.

We have also discovered that a desirable resin composition can be produced by mixing or blending a methylacrylic ester polymer, formed from an ester of the type specified above, with an α-methylstyrene polymer. The mixing or blending of the methacrylic ester polymer and the α-methylstyrene polymer can be effected by the use of conventional mixing methods and means, e.g. mixing rolls, Banbury mixers, and the like. Mixing can be facilitated by the use of any solvent for the two polymers, with subsequent removal of the solvent, e.g. an aromatic solvent such as benzene, toluene, xylene, cumene, halobenzene or halotoluene, a halogen compound of aliphatic hydrocarbon such as chloroform, methylene chloride or ethylene dichloride and carbon disulfide. The amount of solvent used is that sufficient to form a uniform solution.

Reactions such as grafting, cross-linking, and the like may occur in the course of operation but such reactions do not interfere at all with the desirable properties of the final polymer product.

The methacrylic ester polymer and the α-methylstyrene polymer used when two pre-formed polymers are mixed, and the α-methylstyrene polymer dissolved in the methacrylic ester monomer, need not be homopolymers. It is possible to use copolymers composed primarily of a methacrylic ester or copolymers composed primarily of α-methylstyrene, as long as the two copolymers are compatible.

In the case of methacrylic ester copolymers, it is possible to use, as the comonomer, nitriles such as acrylonitrile or methacrylonitrile, acids such as of acrylic acid, methacrylic acid, itaconic acid, maleic acid, fumaric acid, and the like, other polymerizable esters such as vinyl esters, e.g. vinyl acetate, acrylic esters, α-chloroacrylic esters, α-cyanoacrylic esters, methacrylic esters, maleic esters, fumaric esters, cyclic vinyl compounds such as styrene, vinyltoluene, dimethylstyrene, methoxystyrene, chlorostyrene, dichlorostyrene, α-methylstyrene, p-methyl-α-methylstyrene, vinyl pyridine, or vinyl naphthalene, unsaturated hydrocarbons such as ethylene, propylene, isobutene, butadiene, isoprene, and the like, halogenated unsaturated hydrocarbons such as vinyl chloride, vinylidene chloride, vinyl fluoride, chloroprene, and the like, and vinyl ethers such as alkyl vinyl ethers, e.g. methyl vinyl ether, halogenated vinyl ethers, such as chloroethyl vinyl ether, and the like.

As the comonomer of α-methylstyrene, it is possible to use any of the above-named cyclic vinyl compounds, unsaturated hydrocarbons, vinyl ethers and so on.

It will, of course, be understood that the polymer compositions of this invention can be compounded with conventional plasticizers, stabilizers, coloring agents, and the like, in conventional manner.

The invention will be further illustrated by the following specific examples of practical application. However, it will be understood that these examples are not to be construed as limiting the scope of the present invention in any manner. In the examples, all parts are by weight, unless otherwise indicated.

EXAMPLE 1

Mixtures of methyl methacrylate poly-α-methylstyrene having a degree of polymerization of 3300 and produced by polymerization in toluene solution with $BF_3.OEt_2$ as initiator, and 2,2'-azobis-isobutyronitrile were introduced into glass tubes of 13 mm. diameter, in the proportions shown in Table 1, and the tubes were sealed after being flushed with nitrogen. After the poly-α-methylstyrene was completely dissolved, polymerization was effected by heating the solutions for 16.5 hours at 60° C., 2 hours at 100° C., and 2 hours at 120° C. The glass tubes were then removed and there were obtained cylindrical bodies of hard, solid resin. For purposes of comparison, methyl methacrylate was polymerized in like manner but in the absence of poly-α-methylstyrene.

The resin products were then heat-treated for 16.5 hours at 100 to 110° C. in air to remove strain.

The transparency, impact strength and thermal deformation temperature of the resin products thus obtained are shown in Table 1.

*Table 1*

| Composition of Polymerization Mixture | | | Resin Produced | | |
| --- | --- | --- | --- | --- | --- |
| Poly-α-methylstyrene (percent by weight) | Methyl methacrylate (percent by weight) | 2,2'-azobis-isobutyronitrile (percent by weight) | Transparency | Impact Strength | Thermal deformation temperature (° C.) |
| 0 | 100 | 0.01 | Transparent | 0.18 | 116 |
| 10 | 90 | 0.04 | Substantially transparent. | 0.18 | 123 |
| 20 | 80 | 0.08 | ...do... | 0.18 | 127 |

As shown in Table 1, the transparency and impact strength of the resins produced remain essentially the same whether methyl methacrylate is polymerized alone or in the presence of dissolved poly-α-methylstyrene. However, the thermal deformation temperature is clearly improved by effecting polymerization in the presence of the α-methylstyrene polymer. This latter product is thus characterized by increased heat resistance, i.e. it softens or deforms at a higher temperature than the product produced in the absence of α-methylstyrene.

EXAMPLE 2

The procedures described in Example 1 were repeated except that ethyl methacrylate was substituted for the methyl methacrylate used in Example 1. The results are shown in Table 2.

*Table 2*

| Composition of Polymerization Mixture | | | Resin Produced | | |
| --- | --- | --- | --- | --- | --- |
| Poly-α-methylstyrene (percent by weight) | Methyl methacrylate (percent by weight) | 2,2'-azobis-isobutyronitrile (percent by weight) | Transparency | Impact Strength | Thermal deformation temperature (° C.) |
| 0 | 100 | 0.01 | Transparent | 0.18 | 70 |
| 10 | 90 | 0.04 | Substantially transparent. | 0.19 | 70 |
| 20 | 80 | 0.08 | ...do... | 0.18 | 82 |

As shown in Table 2, the transparency and impact strength of the resin are substantially the same whether poly-α-methylstyrene is present or not, but the thermal deformation temperature is clearly improved when polymerization is effected in the presence of the α-methylstyrene polymer.

EXAMPLE 3

10 parts of poly-α-methylstyrene having a degree of polymerization of 3500 were dissolved in 90 parts of propyl methacrylate, to which 0.04 part of 2,2'-azobis-isobutyronitrile was added. Polymerization was carried out as described in Example 1. The product obtained was a semi-transparent solid resin. The thermal deformation temperature of this resin was found to be substantially higher in comparison with a resin produced by polymerizing propyl methacrylate alone.

EXAMPLE 4

A solution consisting of 10 parts of poly-α-methylstyrene having a degree of polymerization of 3300, 90 parts of cyclohexyl methacrylate, and 0.04 part of 2,2'-azobis-isobutyronitrile was polymerized under the influence of heat in the manner described in Example 1. The product obtained was a substantially transparent, solid resin having a Vicat softening point of 104° C. (the temperature at which a needle penetrates under a load of 1 kg.), which is higher than the softening point of a polymer of cyclohexyl methacrylate alone.

EXAMPLE 5

1 part of polymethylmethacrylate (commercially sold under the tradename "Acrypet M") and 1 part of poly-α-methylstyrene having a degree of polymerization of 3300 were dissolved in 20 parts of toluene. The solution was cast on a glass plate. A film of 0.5 mm. in thickness was obtained. This film, when completely dried, was substantially transparent and had an increased softening point in comparison with the softening point of a film formed from polymethylmethacrylate alone.

EXAMPLE 6

A solution containing 20 parts of poly-α-methylstyrene (polymerization degree 2,200), 80 parts of methyl methacrylate and 0.1 part of benxoyl peroxide was put in a casting cell, made of 10 mm. thick glass and a polyvinyl chloride cord as a gasket.

After having ben degassed, the cell was sealed, and placed in the oven at 60° C. for 16.5 hours, 100° C. for 2 hours, then 120° C. for 2 hours for the polymerization of the monomer. Thus a cast sheet of 7 mm. thickness was obtained. Some characteristics of this sheet are shown in the fourth column of Table 3 as compared with those of commercial polymethyl methacrylate sheets in the last column.

Table 3

| Property | Unit | A.S.T.M. method | PMMA [1] sheet including 20 percent by weight of poly-α-methylstyrene | | Commercial PMMA [1] sheet |
|---|---|---|---|---|---|
| | | | I [2] | II [3] | |
| Transparency | | | Almost transparent. | Almost transparent. | Transparent. |
| Index of refraction | $N_D$ | D-542 | 1,519 | | 1,494 |
| Specific gravity | | | 1.16 | 1.16 | 1.17-1.20 |
| Flexural strength | Kg./cm.² | D-790 | | 1,710 | 1,200 |
| Impact strength, $I_{zod}$ | Ft.-lb. per in. of notch. | D-256 | 0.36 | 0.28 | 0.4-0.5 |
| Hardness, Rockwell | { | D-785 | | M 102 | M 80-100 |
| | { | D-785 | R 124 | R 125 | |
| Vicat softening point | °C | D-1521 | 132 | 137 | |
| Heat distortion temperature: | | | | | |
| 66 p.s.i. | °C | D-648 | 125 | 130 | |
| 264 p.s.i. | °C | D-648 | | 124 | 66-99 |

[1] Polymethyl methacrylate.
[2] Polymerization degree of poly-α-methylstyrene used is 2000
[3] Polymerization degree of poly-α-methylstyrene used is 4900.

The obtained product was superior to the commercial products of PMMA alone in heat resistance.

EXAMPLE 7

A solution containing 20 parts of poly-α-methylstyrene (polymerization degree 4900), 80 parts of methyl methacrylate and 0.05 part of benzoyl peroxide was subjected to casting polymerization in similar manner to Example 6 at 60° C. for 16.5 hours, 80° C. for 2 hours, 100° C. for 2 hours, then 120° C. for 2 hours. The properties of the sheet obtained are shown in the fifth column of Table 3 as "II" sheet. This product was also superior to the commercial product of PMMA alone in heat resistance.

The conditions and relative relationships set forth in the examples are those preferred but it will be understood that other conditions and relationships may be used within the scope of the invention. Thus, the ratios between the two polymers in the polymer blend and the ratio between the methacrylic ester monomer and the dissolved poly-α-methylstyrene can vary widely but the methacrylic ester should always be the major component i.e. more than 50% by weight of the finished resin product, preferably at least about 70% by weight. On the other hand, there should be a minimum of at least about 5% by weight of the poly-α-methylstyrene present, both in the case of polymerization of the methacrylic resin in the presence of the dissolved α-methylstyrene polymer and in the case of blending the two preformed polymers.

In general, unless otherwise indicated, conventional polymerization operations and techniques are suitably employed. For example, the polymerization catalyst used may be any of the conventional catalysts employed in the polymerization of methacrylate esters, such as azonitriles or peroxides. Thus, conventional methacrylate ester polymerization techniques, catalysts, temperatures and polymerization apparatus are employed. Typical conventional methacrylic ester polymerization is shown, for example in "Vinyl and Related Polymers," Calvin E. Schildknecht, John Wiley & Sons, Inc., 1952. Chapters IV and V, or "Acrylic Resins," Milton B. Horn, Reinhold Publishing Corporation, 1960. Chapters 3, 5, 6 and 7.

As shown in the foregoing examples, the temperature of polymerization can, for example, be 60° C. to 120° C. and the time of polymerization can vary widely but for best results is advantageously 2 to 16.5 hours, a longer time of polymerization being employed when lower temperatures are used and shorter time of polymerization being employed when higher temperatures are used.

It will also be understod that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. A polymer composition characterized by high heat-resistance and at least substantial transparency comprising a major proportion of a poly-methacrylic ester selected from the group consisting of polymethylmethacrylate, polyethylmethacrylate, polypropylmethacrylate and polycyclohexylmethacrylate, and at least about 5% by weight of poly-α-methylstyrene.

2. The composition of claim 1 wherein the polymethacrylic ester is polymethylmethacrylate.

3. A method of producing a polymer composition characterized by high heat-resistance and at least substantial transparency which polymer composition consists essentially of a major proportion of a mixture of methacrylic ester polymer selected from the group consisting of polymethacrylate, polyethylmethacrylate, polypropylmethacrylate and polycyclohexylmethacrylate having at least about 5% by weight of poly-α-methylstyrene, which comprises polymerizing a major proportion of a mixture of methacrylic ester monomer selected from the group consisting of methylmethacrylate, ethylmethacrylate, propylmethacrylate and cyclohexyl-methacrylate having at least about 5% by weight of poly-α-methylstyrene dissolved therein in the presence of the free radical polymerization catalyst selected from the group consisting of azonitrile and peroxide catalysts.

4. The method of claim 3 wherein the free radical polymer catalyst is 2,2'-azobisisobutyronitrile.

References Cited by the Examiner

UNITED STATES PATENTS

| | | | |
|---|---|---|---|
| 2,326,543 | 8/1943 | Macht | 260—901 |
| 2,887,464 | 5/1959 | Coover et al. | 260—901 |
| 3,037,948 | 6/1962 | Landler et al. | 260—885 |
| 3,070,574 | 12/1962 | Kastning et al. | 260—886 |
| 3,137,663 | 6/1964 | Mullier | 260—885 |
| 3,189,665 | 6/1965 | Nozaki | 260—885 |

MURRAY TILLMAN, *Primary Examiner.*

J. T. GOOLKASIAN, *Assistant Examiner.*